US012497938B2

(12) United States Patent
Malmberg et al.

(10) Patent No.: US 12,497,938 B2
(45) Date of Patent: Dec. 16, 2025

(54) FUEL INJECTOR INTERNAL COMBUSTION ENGINE AND VEHICLE

(71) Applicant: Scania CV AB, Södertälje (SE)

(72) Inventors: Andreas Malmberg, Bandhagen (SE); Per Falk, Hägersten (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/858,425

(22) PCT Filed: Apr. 12, 2023

(86) PCT No.: PCT/SE2023/050339
§ 371 (c)(1),
(2) Date: Oct. 21, 2024

(87) PCT Pub. No.: WO2023/204745
PCT Pub. Date: Oct. 26, 2023

(65) Prior Publication Data
US 2025/0264080 A1 Aug. 21, 2025

(30) Foreign Application Priority Data
Apr. 22, 2022 (SE) .................................. 2250482-3

(51) Int. Cl.
*F02M 47/02* (2006.01)

(52) U.S. Cl.
CPC ....... *F02M 47/027* (2013.01); *F02M 2200/21* (2013.01); *F02M 2200/302* (2013.01)

(58) Field of Classification Search
CPC ............ F02M 47/027; F02M 2200/21; F02M 2200/302
See application file for complete search history.

(56) References Cited

U.S. PATENT DOCUMENTS 6,655,654 B1 * 12/2003 Cotton, III ......... F02M 63/0026 239/102.1
2014/0027534 A1 * 1/2014 Rapp .................... F02M 47/027 239/71
2019/0120162 A1 4/2019 Choi

FOREIGN PATENT DOCUMENTS

CA 2809249 A1 5/2013
DE 102006014251 A1 * 10/2007 ......... F02M 51/0603
(Continued)

OTHER PUBLICATIONS

International Search Report and Written Opinion for PCT Application PCT/SE2023/050339 dated May 29, 2023.

*Primary Examiner* — Hung Q Nguyen
(74) *Attorney, Agent, or Firm* — Joseph T. Leone; Yanjun Ma; DeWitt LLP

(57) ABSTRACT

A fuel injector (1) is disclosed comprising a needle (15) a fuel supply port (17) fluidly connected to a fuel cavity (13) and a control valve arrangement (3) comprising a control valve (4) fluidly connected to the fuel cavity (13). The control valve arrangement (3) comprises an armature assembly (6) connected to the control valve (4) via a valve control portion (6') of the armature assembly (6). The control valve arrangement (3) comprises an armature actuator (7) configured to move the armature assembly (6) to cause a lift of the needle (15) from a valve seat (12) and a movement limiting assembly (9, 9', 9'', 9''') configured to limit the movement of the valve control portion (6') upon activation. The movement limiting assembly (9, 9', 9'', 9''') is configured to be activated by changing the polarity of the electricity supplied to the armature actuator (7). The present disclosure further relates to an internal combustion engine (40) and a vehicle (2).

16 Claims, 6 Drawing Sheets

(56) References Cited

FOREIGN PATENT DOCUMENTS

| | | | | | |
|---|---|---|---|---|---|
| DE | 102011121384 | A1 | | 6/2013 | |
| DE | 102012004472 | A1 | | 9/2013 | |
| EP | 0789142 | A1 | | 8/1997 | |
| EP | 0987432 | A2 | * | 3/2000 | ........... F02M 47/027 |
| EP | 3483420 | A1 | | 5/2019 | |
| GB | 2289313 | A | * | 11/1995 | ......... F02M 63/0049 |
| JP | 2009222057 | A | | 10/2009 | |
| WO | WO-2005121544 | A1 | * | 12/2005 | ......... F02M 51/0603 |

* cited by examiner

FUEL INJECTOR INTERNAL COMBUSTION ENGINE AND VEHICLE

TECHNICAL FIELD

The present disclosure relates to a fuel injector configured to inject fuel into a combustion chamber of an internal combustion engine. The present disclosure further relates to an internal combustion engine comprising a fuel injector and a vehicle comprising an internal combustion engine.

BACKGROUND

Internal combustion engines, such as four-stroke internal combustion engines, comprise one or more cylinders and a piston arranged in each cylinder. The pistons are connected to a crankshaft of the engine and are arranged to reciprocate within the cylinders upon rotation of the crankshaft. The engine usually further comprises one or more inlet valves and outlet valves as well as one or more fuel supply arrangements. The one or more inlet valves and outlet valves are controlled by a respective valve control arrangement usually comprising one or more camshafts rotatably connected to a crankshaft of the engine, via a belt, chain, gears, or similar. A four-stroke internal combustion engine completes four separate strokes while turning a crankshaft. A stroke refers to the full travel of the piston along the cylinder, in either direction. The uppermost position of the piston in the cylinder is usually referred to as the top dead centre TDC, and the lowermost position of the piston in the cylinder is usually referred to as the bottom dead centre BDC.

The strokes are completed in the following order, inlet stroke, compression stroke, expansion stroke and exhaust stroke. During operation of a conventional four-stroke internal combustion engine, the inlet valve control arrangement controls inlet valves of a cylinder to an open state during the inlet stroke of a piston within the cylinder, to allow air, or a mixture of air and fuel, to enter the cylinder. During the compression stroke, all valves should be closed to allow compression of the air, or the mixture of the air and fuel, in the cylinder. If the engine is in a power producing state, fuel in the cylinder is ignited, usually towards the end of the compression stroke, for example by a spark plug or by compression heat in the cylinder. The combustion of fuel within the cylinder significantly increases pressure and temperature in the cylinder. The combustion of the fuel usually continues into a significant portion of the subsequent expansion stroke. The increased pressure and temperature in the cylinder obtained by the combustion is partially converted into mechanical work supplied to the crank shaft during the expansion stroke. The expansion stroke is also usually referred to as the combustion stroke, since usually, most of the combustion takes place during the expansion stroke. In the subsequent exhaust stroke, the exhaust valve control arrangement controls exhaust valves of the cylinder to an open state to allow exhaust gases to be expelled out of the cylinder into an exhaust system of the combustion engine.

A fuel injector is a device used for supplying fuel into a combustion chamber of an internal combustion engine. Compression ignition engines, such as diesel engines, and some spark ignition engines, such as Otto engines, use a fuel injector for supplying fuel directly into a combustion chamber. Gasoline engines having a fuel injector for supplying fuel directly into a combustion chamber are usually referred to as gasoline direct injection engines. In diesel engines, the injected fuel is ignited by compression heat, or by a glow plug. In Otto engines, the injected fuel is ignited by a spark of a spark plug. Development of fuel injectors have led to high injection pressures of the fuel which is advantageous for reducing exhaust emissions from the engine, such as formation of soot. In addition, for compression ignition engines, fuel injectors have been developed capable of performing several successive injections during a combustion cycle, which puts demands on the design of the fuel injector.

The fuel injector is a vital part for the fuel economy and emission control of a combustion engine. As indicated, many modern fuel injectors are capable of performing different injection events during a combustion cycle which can include a pilot injection, a main injection, and a post injection. Moreover, many fuel injectors can be controlled to perform several successive pilot injections and post injections in one combustion cycle.

A pilot injection is performed in the compression stroke prior to a main injection. A pilot injection can increase the temperature in the combustion chamber to ensure combustion and create prerequisites for a main combustion event following the main injection.

A post injection is normally performed towards the end of a main combustion event, or after a main combustion event, to increase the exhaust temperature of the engine. The increased exhaust temperature can be advantageous for the efficiency of an exhaust after treatment system of the engine. As an alternative, or in addition, a post injection can be performed to increase the available exhaust energy for a turbine of a turbocharger.

The amount of injected fuel is significantly smaller in a pilot or post injection than in a main injection which puts demands on the design of the fuel injector. One key aspect in injector performance is to be able to provide small quantity pilot and post injections with high precision. That is, the smaller and more controlled these pilot injections can be, the better fuel economy because it is beneficial for the efficiency of the combustion engine to make sure the injection spray develops fast during main injection.

The main injection event however needs to develop fast and are large in volume compared to the pilot injections. Moreover, the size of the main injection, i.e., the amount of fuel injected during the main injection, substantially follows the output power of the engine. Therefore, at least on some occasions, a fuel injector must be able to inject large quantities of fuel.

Accordingly, in order to optimize combustion, there is a demand for high flow injectors with very fast opening and closing rates. However, the requirements of fast and large main injections and small quantity pilot and post injections with good precision are conflicting requirements. That is, optimizing a fuel injector for providing fast and large main injections usually impar the ability of the fuel injector to provide small quantity pilot and post injections with good precision, and vice versa.

SUMMARY

It is an object of the present invention to overcome, or at least alleviate, at least some of the above-mentioned problems and drawbacks.

According to a first aspect of the invention, the object is achieved by a fuel injector configured to inject fuel into a combustion chamber of an internal combustion engine. The fuel injector comprises an injector body forming a valve seat, a fuel orifice at the valve seat, and a fuel cavity fluidly connected to the fuel orifice. The fuel injector further comprises a needle arranged in the injector body and being configured to open and close the fuel orifice by interacting with the valve seat. The fuel injector further comprises a fuel supply port fluidly connected to the fuel cavity. The fuel injector further comprises a control valve arrangement, wherein the control valve arrangement comprises a control valve fluidly connected to a control volume of the fuel cavity, an armature assembly operably connected to the control valve via a valve control portion of the armature assembly, and an armature actuator configured to move the armature assembly from a closing position towards an opening position to open the control valve thereby causing a lift of the needle from the valve seat by hydraulic pressure of fuel supplied to the fuel cavity via the fuel supply port. The control valve arrangement further comprises a movement limiting assembly configured to limit the movement of the valve control portion upon activation. The movement limiting assembly is configured to be activated by changing the polarity of the electricity supplied to the armature actuator.

Since the control valve arrangement of the fuel injector comprises the movement limiting assembly which is configured to limit the movement of the valve control portion upon activation, a slower and more controlled movement of the valve control portion of the armature assembly is provided upon activation of the movement limiting assembly. In this manner, a slower and more controlled lift movement of the needle can be provided upon activation of the movement limiting assembly.

As a result, a fuel injector is provided having conditions for performing more controlled and accurate smaller types of injections, such as pilot and post injections, simply by activating the movement limiting assembly. Moreover, a fuel injector is provided having conditions for allowing faster lift movements of the needle when wanted, such as upon larger types of injections, for example larger types of main injections, simply by not activating, or by deactivating, the movement limiting assembly.

Further, because the movement limiting assembly is configured to be activated by changing the polarity of the electricity supplied to the armature actuator, the movement limiting assembly can be activated in a simple, efficient, reliable, and cost-efficient manner. This is because the need for an actuator configured to activate the movement limiting assembly is circumvented, apart from an actuator in the form of a polarity switching assembly configured to switch the polarity of the electricity supplied to the armature actuator. As a further result, the number of electrical wires routed to the fuel injector can be reduced. Moreover, a compact fuel injector can be provided having no, or only a minor, impact on exterior design of the fuel injector and thereby minimized risk to violate existing engine envelopes.

Thus, due to the features of the fuel injector, conditions are provided for a control of the speed of the needle during an injection event. For example, the movement limiting assembly can be activated if there is a need for a slow needle speed after a certain lift. The activation of the movement limiting assembly can cause the outlet flow from the control volume of the fuel cavity to decrease, which slows down the needle movement.

Moreover, due to the features of the fuel injector, an improved control of the injection is obtained in a non-complex and cost-effective manner, while ensuring a low impact on exterior design of the fuel injector and thereby minimized risk to violate existing engine envelopes.

Furthermore, since the fuel injector has conditions for providing more controlled and accurate smaller types of injections, as well as fast and accurate larger types of injections, a fuel injector is provided having conditions for reducing the fuel consumption and emission levels of an internal combustion engine comprising the fuel injector.

Accordingly, a fuel injector is provided overcoming, or at least alleviating, at least some of the above-mentioned problems and drawbacks. As a result, the above-mentioned object is achieved.

Optionally, the control valve arrangement comprises a spring configured to apply a biasing force onto the armature assembly towards the closing position. Thereby, a simple, efficient, and reliable control of the movement of the armature assembly can be provided.

Optionally, the movement limiting assembly is configured to limit the movement of the valve control portion by increasing the biasing force of the spring. Thereby, an improved control of the injection can be obtained in a simple, efficient, and cost-effective manner.

Optionally, the spring is a coil spring, and wherein at least part of the movement limiting assembly is arranged inside the spring. Thereby, an improved control of the injection is obtained in a simple, efficient, and cost-effective manner, while a compact fuel injector can be provided having no, or only a minor, impact on exterior design of the fuel injector and thereby minimized risk to violate existing engine envelopes.

Optionally, the spring is a coil spring, and wherein the movement limiting assembly is configured to limit the movement of the valve control portion by inserting a number of elements between windings of the spring upon actuation. Thereby, an improved control of the injection can be obtained in a simple, efficient, and reliable manner. Moreover, a compact fuel injector can be provided having no, or only a minor, impact on exterior design of the fuel injector and thereby minimized risk to violate existing engine envelopes.

Optionally, the spring is configured to apply the biasing force onto the armature assembly by applying a separating force between a first and second abutments, and wherein the movement limiting assembly is configured to limit the movement of the valve control portion by reducing the distance between the first and second abutments upon actuation. Thereby, an improved control of the injection can be obtained in a simple, efficient, reliable, and cost-efficient manner. Moreover, a compact fuel injector can be provided having no, or only a minor, impact on exterior design of the fuel injector and thereby minimized risk to violate existing engine envelopes.

Optionally, the armature actuator is configured to move the armature assembly by moving an armature unit of the armature assembly, and wherein the movement limiting assembly is arranged between the armature unit and the valve control portion. Thereby, an improved control of the injection can be obtained in a simple, efficient, and reliable manner. Moreover, a compact fuel injector can be provided having no, or only a minor, impact on exterior design of the fuel injector and thereby minimized risk to violate existing engine envelopes.

Optionally, the movement limiting assembly is configured to limit the movement of the valve control portion by increasing the distance between the armature unit and the valve control portion. Thereby, an improved control of the injection can be obtained in a simple, efficient, reliable, and cost-efficient manner.

Optionally, the armature actuator comprises an electromagnet configure to generate a magnetic field to move the armature assembly from the closing position towards the opening position. Thereby, a simple, efficient, reliable, and cost-efficient armature actuator is provided.

Optionally, the movement limiting assembly comprises a magnet configured to assume different positions based on the polarity of the electricity supplied to the electromagnet. Thereby, an improved control of the injection can be obtained in a simple, efficient, reliable, and cost-efficient manner. Moreover, a compact fuel injector can be provided having no, or only a minor, impact on exterior design of the fuel injector and thereby minimized risk to violate existing engine envelopes.

Optionally, the movement limiting assembly comprises an excentre operably connected to the magnet. Thereby, an improved control of the injection can be obtained in a simple, efficient, reliable, and cost-efficient manner. Moreover, a compact fuel injector can be provided having no, or only a minor, impact on exterior design of the fuel injector and thereby minimized risk to violate existing engine envelopes.

Optionally, the control valve arrangement comprises a movement limiting actuator for activating the movement limiting assembly. Thereby, conditions are provided for a further improved control of the fuel injection because conditions are provided for an improved control of the movement of the valve control portion of the armature assembly and thereby also of the fuel injection.

Optionally, the movement limiting actuator comprises a piezoelectric element. Thereby, conditions are provided for a further improved control of the fuel injection because conditions are provided for an improved control of the movement of the valve control portion of the armature assembly.

Optionally, the movement limiting actuator comprises a linear motor. Thereby, a simple, efficient, reliable, and cost-efficient movement limiting actuator is provided.

According to a second aspect of the invention, the object is achieved by an internal combustion engine comprising a fuel injector according to some embodiments of the present disclosure, wherein the fuel injector is configured to inject fuel into a combustion chamber of the internal combustion engine.

Since the internal combustion engine comprises a fuel injector according to some embodiments, an internal combustion engine is provided comprising a fuel injector having conditions for providing more controlled and accurate smaller types of injections, as well as fast and accurate larger types of injections, into a combustion chamber of the internal combustion engine. As a result, an internal combustion engine is provided having conditions for a reduced fuel consumption and emission levels.

Moreover, due to the features of the fuel injector, an internal combustion engine is provided having improved control of injection of fuel in a non-complex and cost-effective manner, while ensuring a low impact on design of the internal combustion engine.

Accordingly, an internal combustion engine is provided overcoming, or at least alleviating, at least some of the above-mentioned problems and drawbacks. As a result, the above-mentioned object is achieved.

According to a third aspect of the invention, the object is achieved by a vehicle comprising an internal combustion engine according to some embodiments of the present disclosure. Since the vehicle comprises an internal combustion engine according to some embodiments, a vehicle is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
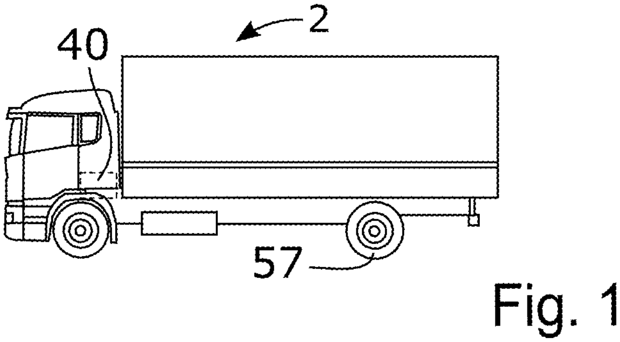
FIG. 1 schematically illustrates a vehicle according to some embodiments.

FIG. 1 schematically illustrates a vehicle 2 according to some embodiments. According to the illustrated embodiments, the vehicle 2 is a truck, i.e., a type of heavy vehicle. According to further embodiments, the vehicle 2, as referred to herein, may be another type of heavy or lighter type of manned or unmanned vehicle for land or water-based propulsion such as a lorry, a bus, a construction vehicle, a tractor, a car, a ship, a boat, or the like.

The vehicle 2 comprises an internal combustion engine 40. According to the illustrated embodiments, the internal combustion engine 40 is configured to provide motive power to the vehicle 2 via wheels 57 of the vehicle 2.

Figure 2:
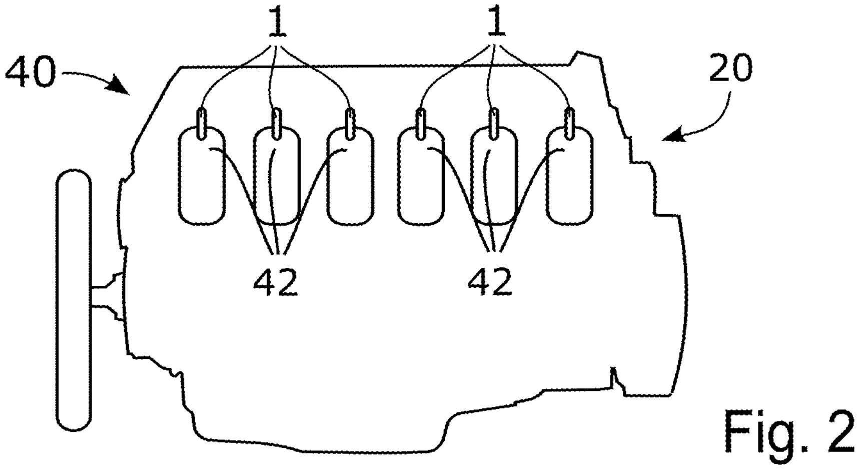
FIG. 2 schematically illustrates an internal combustion engine of the vehicle illustrated in FIG. 1, FIG. 3 schematically illustrates one fuel injector and a control arrangement of the internal combustion engine illustrated in FIG. 2.

FIG. 2 schematically illustrates the internal combustion engine 40 of the vehicle 2 illustrated in FIG. 1. The internal combustion engine 40 is in some places herein referred to as the "combustion engine 40", or simply "the engine 40", for reasons of brevity and clarity. Below, simultaneous reference is made to FIG. 1 and FIG. 2, if not indicated otherwise.

The vehicle 2 may comprise one or more electric propulsion motors in addition to the internal combustion engine 40 for providing motive power to the vehicle 2. Thus, the vehicle 2, as referred to herein, may comprise a so-called hybrid electric powertrain comprising one or more electric propulsion motors in addition to the combustion engine 40 for providing motive power to the vehicle 2.

According to the illustrated embodiments, the internal combustion engine 40 comprises six cylinders 20 arranged in one row. The internal combustion engine 40 according to the illustrated embodiments may therefore be referred to an inline-six engine. However, according to further embodiments, the internal combustion engine 40, as referred to herein, may comprise another number of cylinders 20. Moreover, the cylinders 20 of the internal combustion engine 40 may be arranged in another configuration than in one row, such as in two or more rows.

According to embodiments herein, the internal combustion engine 40 is a four-stroke internal combustion engine. Moreover, according to the illustrated embodiments, the internal combustion engine 40 is a diesel engine, i.e., a type of compression ignition engine. The internal combustion engine 40 may thus be a compression ignition engine configured to operate on diesel or a diesel-like fuel, such as biodiesel, biomass to liquid (BTL), or gas to liquid (GTL) diesel. Diesel-like fuels, such as biodiesel, can be obtained from renewable sources such as vegetable oil which mainly comprises fatty acid methyl esters (FAME). Diesel-like fuels can be produced from many types of oils, such as rapeseed oil (rapeseed methyl ester, RME) and soybean oil (soy methyl ester, SME).

According to further embodiments, the internal combustion engine 40, as referred to herein, may be an Otto engine with a spark-ignition device, wherein the Otto engine may be configured to run on petrol, alcohol, similar volatile fuels, or combinations thereof. Alcohol, such as ethanol, can be derived from renewable biomass. According to some embodiments, the internal combustion engine 40, as referred to herein, may be arranged to power another type of device or system than a vehicle, such as for example an electric generator.

Each cylinder 20 of the internal combustion engine 40 comprises a piston connected to a crankshaft of the internal combustion engine 40, wherein the piston is configured to reciprocate in the cylinder upon rotation of the crankshaft. Combustion chambers 42 are formed between a piston top and cylinder walls of the cylinders 20 of the internal combustion engine 40.

The internal combustion engine 40 comprises a number of fuel injectors 1, wherein each fuel injector 1 is configured to inject fuel into a combustion chamber 42 the internal combustion engine 40. In other words, according to the illustrated embodiments, the internal combustion engine 40 comprises the same number of fuel injectors 1 as the number of cylinders 20.

Figure 3:
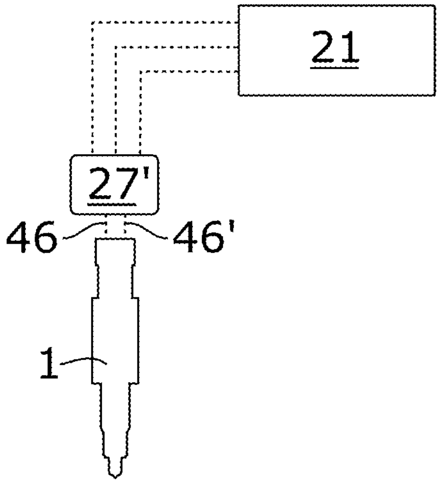

FIG. 3 schematically illustrates one fuel injector 1 and a control arrangement 21 of the internal combustion engine 40 illustrated in FIG. 2. As is further explained herein, the control arrangement 21 is configured to control the operation of the fuel injector 1.

Figure 4:
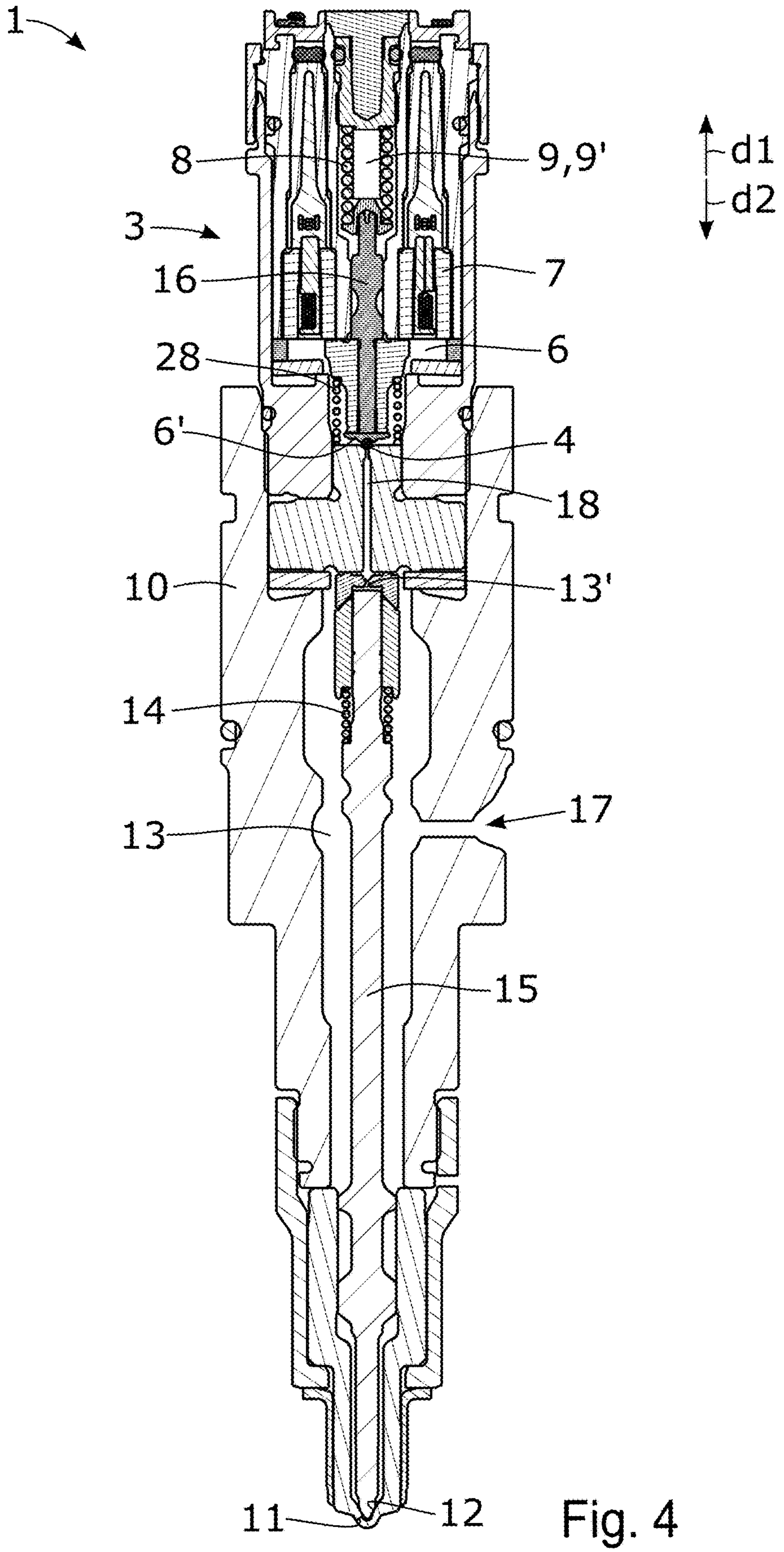
FIG. 4 illustrates a cross section of a fuel injector according to some embodiments of the internal combustion engine illustrated in FIG. 2.

FIG. 4 illustrates a cross section of a fuel injector 1 according to some embodiments of the internal combustion engine 40 illustrated in FIG. 2. Below, simultaneous reference is made to FIG. 1-FIG. 4, if not indicated otherwise. As explained above, the fuel injector 1 is configured to inject fuel into a combustion chamber 42 of an internal combustion engine 40, such as the internal combustion engine 40 illustrated in FIG. 1 and FIG. 2.

The fuel injector 1 comprises an injector body 10 forming a valve seat 12, a fuel orifice 11 at the valve seat 12, and a fuel cavity 13 fluidly connected to the fuel orifice 11. Moreover, the fuel injector 1 comprises a needle 15 arranged in the injector body 10. The needle 15 is movably arranged in the injector body 10 between a closing position and an opening position. In the closing position, the needle 15 abuts against the valve seat 12 to close a fluid connection between the fuel cavity 13 and the fuel orifice 11. In the opening position, the needle 15 is lifted from the valve seat 12 to open a fluid connection between the fuel cavity 13 and the fuel orifice 11. In other words, the needle 15 is configured to open and close the fuel orifice 11 by interacting with the valve seat 12.

According to the illustrated embodiments, the needle 15 is movably arranged in the injector body 10 along the directions d1 and d2 indicated in FIG. 4. In more detail, according to the illustrated embodiments, the needle 15 is moved from the closing position towards the opening position along the direction d1 indicated in FIG. 4 and is moved from the opening position towards the closing position along the direction d2. According to the illustrated embodiments, the fuel injector 1 comprises a spring member 14 configured to bias the needle 15 towards the closing position, i.e., the spring member 14 is configured to bias the needle 15 in the direction d2 illustrated in FIG. 4.

In FIG. 4, the needle 15 is illustrated in the closing position. Moreover, in FIG. 4, only one fuel orifice 11 is indicated. However, the fuel injector 1 may comprise a greater number of fuel orifices 11. The fuel orifice 11 may also be referred to as a fuel opening, a fuel supply hole, a fuel nozzle, or the like.

The fuel injector 1 further comprises a fuel supply port 17 fluidly connected to the fuel cavity 13. The fuel supply port 17 is configured to be connected to a high-pressure fuel supply conduit. That is, the internal combustion engine 40 comprising the fuel injector 1 may comprise a fuel supply system configured to supply fuel at high pressure to each fuel supply port 17 of the fuel injectors 1 of the internal combustion engine 40.

The fuel supply system may be a so-called common rail system. The fuel supply system may be configured to supply fuel at a pressure of above 300 bar, or above 1 500 bar, to each fuel supply port 17 of the fuel injectors 1 of the internal combustion engine 40.

The fuel injector 1 comprises a control valve arrangement 3. As is further explained herein, the control valve arrangement 3 is configured to control the movement of the needle 15 between the opening and closing position by controlling a hydraulic pressure inside a control volume 13' of the fuel cavity 13.

Figure 5:
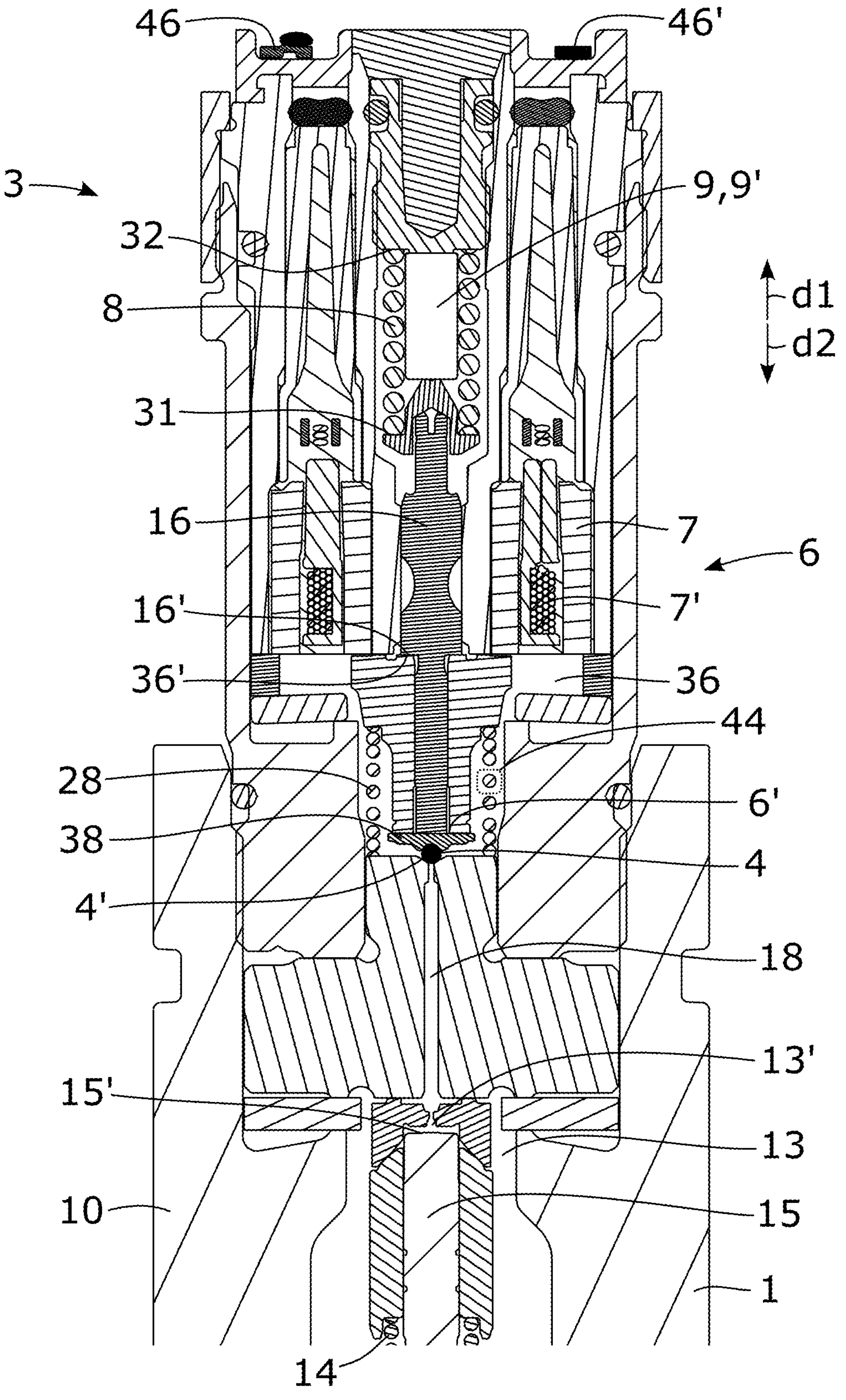
FIG. 5 illustrates an enlarged view of a control valve arrangement of the fuel injector illustrated in FIG. 4, FIG. 6 schematically illustrates a movement limiting assembly according to some embodiments, FIG. **7*a* schematically illustrates a movement limiting assembly according to some further embodiments, FIG. 7*b* schematically illustrates the movement limiting assembly illustrated in FIG. 7*a* in which an excentre is illustrated in a second position.

FIG. 5 illustrates an enlarged view of the control valve arrangement 3 of the fuel injector 1 illustrated in FIG. 4. Moreover, in FIG. 5, a portion of the injector body 10 of the fuel injector 1 can be seen as well as a portion of the needle 15 of the fuel injector 1. Below, simultaneous reference is made to FIG. 1-FIG. 5, if not indicated otherwise.

The control valve arrangement 3 comprises a control valve 4. The control valve 4 is fluidly connected to the control volume 13' of the fuel cavity 13 via a channel 18. As is best seen in FIG. 5, the control volume 13' of the fuel cavity 13 is delimited by a top surface 15' of the needle 15. The control volume 13' is fluidly connected to the remaining part of the fuel cavity 13, and thereby also to the fuel supply port 17, via a narrow flow restricting channel.

According to the illustrated embodiments, the control valve 4 comprises a ball valve configured to abut against a control valve seat 4' when the valve is closed, as is illustrated in FIG. 4 and FIG. 5.

As is further explained herein, the control valve arrangement 3 comprises an armature assembly 6 operably connected to the control valve 4 via a valve control portion 6' of the armature assembly 6.

In more detail, the armature assembly 6 comprises an armature unit 36, a plunger 16, a spring 8, and a retainer 38. The plunger 16 is movably arranged in the armature unit 36. However, the plunger 16 comprises a plunger abutment 16' configured to abut against an armature abutment 36' of the armature unit 36. The plunger 16 is biased by the spring 8 in a direction d2 towards the armature unit 36 and towards the retainer 38. According to the illustrated embodiments, the spring 8 is a coil spring. The abutting contact between the plunger abutment 16' and the armature abutment 36' forces the armature unit 36 in the direction d2 towards the retainer 38.

A respective end portion of the plunger 16 and of the armature unit 36 abuts against the retainer 38. The retainer 38 is in abutting contact with the ball valve of the control valve 4.

Thus, due to these features, the spring 8 also biases the retainer 38 in the direction d2 towards the control valve 4, and thereby also the ball valve of the control valve 4 against the control valve seat 4'. The control valve arrangement 3 comprises a second spring member 28 configured to bias the armature unit 36 in the direction d1 away from the control valve seat 4'. However, the biasing force of the second spring member 28 is lower than the biasing force of the spring 8. In other words, due to these features, the spring 8 is configured to force, i.e., apply a biasing force onto, the armature assembly 6 towards a closing position. As is indicated in FIG. 5, according to the illustrated embodiments, the spring 8 is configured to apply the biasing force onto the armature assembly 6 by applying a separating force between a first and second abutments 31, 32. The respective end portion of the plunger 16 and of the armature unit 36 is herein together referred to as a valve control portion 6' of the armature assembly 6.

The control valve arrangement 3 comprises an armature actuator 7. As is further explained in the following, the armature actuator 7 is configured to move the armature assembly 6 from a closing position towards an opening position to open the control valve 4 thereby causing a lift of the needle 15 from the valve seat 12 by hydraulic pressure of fuel supplied to the fuel cavity 13 via the fuel supply port 17 of the fuel injector 1.

According to the illustrated embodiments, the armature actuator 7 is configured to move the armature assembly 6 from the closing position towards an opening position by moving the armature unit 36 in the direction d1 away from the control valve 4 when the armature actuator 7 is activated. Due to the abutting contact between the plunger abutment 16' and the armature abutment 36', the plunger 16 is also moved in the direction d1 away from the control valve 4 when the armature actuator 7 is activated.

As mentioned, the control volume 13' of the fuel cavity 13 is fluidly connected to the remaining part of the fuel cavity 13, and thereby also to the fuel supply port 17, via a narrow flow restricting channel. Therefore, the fuel pressure inside the control volume 13' of the fuel cavity 13 substantially corresponds to the fuel pressure in the remaining part of the fuel cavity 13 when the control valve 4 is closed at steady state conditions. As an example, if a fuel pressure of approximately 1 500 bar is supplied to the fuel supply port 17 and the control valve 4 is closed, the fuel pressure inside the control volume 13' of the fuel cavity 13 will rise to 1 500 bar after a certain short time. This is because the control volume 13' of the fuel cavity 13 is fluidly connected to the remaining part of the fuel cavity 13 via the narrow flow restricting channel.

However, when the armature actuator 7 is activated and the valve control portion 6' of the armature assembly 6 is moved in the direction d1 away from the retainer 38, a movement of the ball valve of the control valve 4 is allowed in a direction d1 away from the control valve seat 4'. Accordingly, the high pressure of fuel in the channel 18, which is connected to the control valve 4, forces the ball valve 4 and the retainer 38 in the direction d1 away from the control valve seat 4' when the valve control portion 6' of the armature assembly 6 is moved in the direction d1 away from the control valve seat 4'.

In this manner, the control valve 4 is opened and fuel is allowed to flow from the control volume 13' through the channel 18, through the control valve 4 into a drainage passage 44 of the fuel injector 1 which reduces the pressure of fuel inside the control volume 13'. Due to the narrow flow restricting channel connecting the control volume 13' to the remaining part of the fuel cavity 13, the fuel pressure inside the control volume 13' will be lower than the fuel pressure inside the remaining part of the fuel cavity 13. As a result, the hydraulic pressure of fuel inside the fuel cavity 13 acting on the needle 15 lifts the needle 15 from the valve seat 12. In this manner, fuel is allowed to flow from the fuel cavity 13 into a combustion chamber 42 via the fuel orifice 11 of the fuel injector 1.

The feature that the needle 15 is lifted from the valve seat 12 means that the needle 15 is moved in a direction d1 away from the valve seat 12. The spring member 14 is compressed when the needle 15 is lifted from the valve seat 12. Likewise, as understood from the above described, the spring 8 of the control valve arrangement 3 is compressed when the armature actuator 7 is moved towards the opening position.

When the armature actuator 7 is deactivated, the biasing force of the spring 8 moves the armature assembly 6 towards the closing position, i.e., moves the valve control portion 6' of the armature assembly 6 in the direction d2 towards the retainer 38. The retainer 38 is thereby moved in the direction d2 towards the ball valve of the control valve 4 which moves the ball valve of the control valve 4 towards the control valve seat 4'. When the ball valve of the control valve 4 reaches the control valve seat 4' and is pressed against the control valve seat 4', the control valve 4 closes which prevents further flow of fuel from the control volume 13' to the drainage passage 44 via the control valve 4.

In this manner, the pressure of fuel rises inside the control volume 13' which together with the biasing force of the spring member 14 forces the needle 15 to move towards the valve seat 12 which closes the fuel orifice 11 thereby preventing further flow of fuel into a combustion chamber 42 via the fuel orifice 11.

According to the illustrated embodiments, the armature actuator 7 comprises an electromagnet 7' configure to generate a magnetic field to move the armature assembly 6 from the closing position towards the opening position. The electromagnet 7' comprises wire windings connected to a pair of electrical connections 46, 46'. The pair of electrical connections 46, 46' is also indicated in FIG. 2. According to the illustrated embodiments, the armature actuator 7 is activated by supplying an electric current through the wire windings of the electromagnet 7' which moves the armature unit 36 by a magnetic interaction between the wire windings of the electromagnet 7' and metal parts of the armature unit 36.

According to embodiments herein, the control valve arrangement 3 comprises a movement limiting assembly 9, 9'. The movement limiting assembly 9, 9' is configured to limit the movement of the valve control portion 6' of the armature assembly 6 when the movement limiting assembly 9, 9' is activated. In this manner, as is further explained herein, a slower and more controlled movement of the valve control portion 6' of the armature assembly 6 is provided upon activation of the movement limiting assembly 9, 9'. In this manner, a slower and more controlled lift movement of the needle 15 can be provided upon activation of the movement limiting assembly 9, 9'.

Thereby, a fuel injector 1 is provided having conditions for performing more controlled and accurate smaller types of injections, such as pilot and post injections, simply by activating the movement limiting assembly 9, 9'. Moreover, a fuel injector 1 is provided having conditions for allowing faster lift movements of the needle 15 when wanted, such as upon larger types of injections, for example larger types of main injections, simply by not activating, or by deactivating, the movement limiting assembly 9, 9'.

According to the embodiments illustrated in FIG. 5, the movement limiting assembly 9, 9' is arranged inside the spring 8. According to further embodiments, at least part of the movement limiting assembly 9, 9' may be arranged inside the spring 8.

Figure 6:
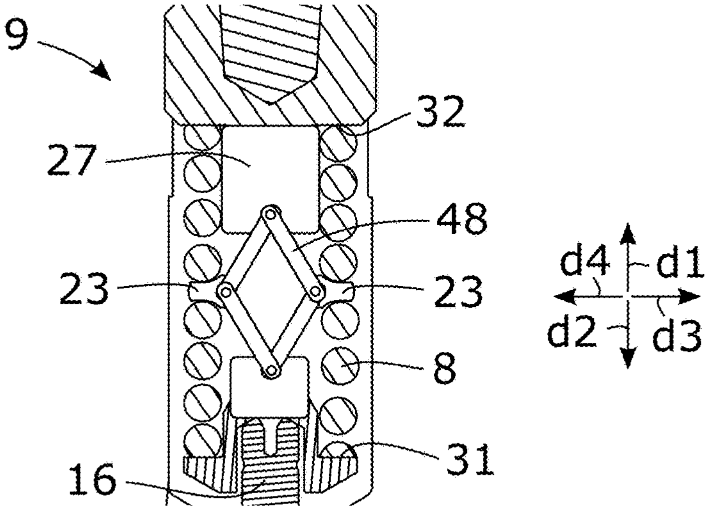

FIG. 6 schematically illustrates a movement limiting assembly 9 according to some embodiments. Below, simultaneous reference is made to FIG. 1-FIG. 6, if not indicated otherwise. In FIG. 6, a portion of the plunger 16 can be seen. Furthermore, in FIG. 6, some directions d1-d4 are indicated, wherein the directions d1, d2 coincides with the directions d1, d2 indicated in FIG. 5, and wherein each of the directions d3, d4 is perpendicular to the directions d1, d2.

According to the embodiments illustrated in FIG. 6, the movement limiting assembly 9 is configured to limit the movement of the valve control portion 6' of the armature assembly 6 by inserting a number of elements 23 between the windings of the spring 8 upon actuation. The insertion of the number of elements 23 between the windings of the spring 8 prevents compression of the spring 8. Moreover, the insertion of the number of elements 23 between the windings of the spring 8 increases the biasing force of the spring 8. In this manner, the movement of the valve control portion 6' of the armature assembly 6 can be limited when the movement limiting assembly 9, 9' is activated.

According to the embodiments illustrated in FIG. 6, the movement limiting assembly 9, 9' comprises a movement limiting actuator 27 operably connected to the number of elements 23 via a linkage 48. According to further embodiments, the movement limiting actuator 27 may be operably connected to the number of elements 23 in another manner. When the movement limiting assembly 9, 9' is activated, the movement limiting actuator 27 forces the number of elements 23 in the directions d3, d4 indicated in FIG. 6. As a result, the number of elements 23 is inserted between the windings of the spring 8 and the number of elements 23 assumes the positions as illustrated in FIG. 6. When the movement limiting assembly 9, 9' is deactivated, the movement limiting actuator 27 forces the number of elements 23 out from the windings of the spring 8. The movement limiting actuator 27 may comprise a piezoelectric element, a linear motor, or the like.

Figure 7A:
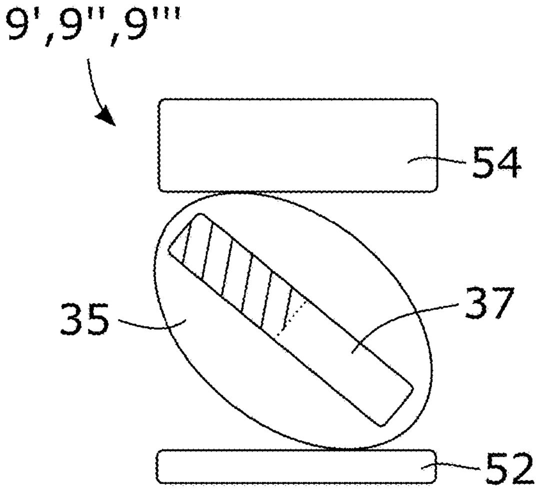

FIG. 7*a* schematically illustrates a movement limiting assembly 9', 9'', 9''' according to some further embodiments. The control valve arrangement 3 of the fuel injector 1 illustrated in FIG. 5 may comprise a movement limiting assembly 9', 9'', 9''' according to the embodiments illustrated in FIG. 7*a*. Below, simultaneous reference is made to FIG. 1-FIG. 7*a*, if not indicated otherwise.

According to the embodiments illustrated in FIG. 7*a*, the movement limiting assembly 9', 9'', 9''' comprises a magnet 37. Moreover, the movement limiting assembly 9', 9'', 9''' comprises an excentre 35 operably connected to the magnet 37. According to the illustrated embodiments, the excentre 35 is operably connected to the magnet 37 by the magnet 37 being arranged inside the excentre 35. According to further embodiments, the excentre 35 may be operably connected to the magnet 37 in another manner.

According to these embodiments, the magnet 37 is configured to assume different positions based on the polarity of the electricity supplied to the electromagnet 7'. That is, in these embodiments, the movement limiting assembly 9', 9'', 9''' is activated by changing the polarity of the electricity supplied to the armature actuator 7.

As is indicated in FIG. 2, the fuel injector 1 may comprise, or may be associated with, a movement limiting actuator 27' configured to activate the movement limiting assembly 9', 9'', 9''' by switching polarity of the electricity supplied to the electromagnet 7' of the armature actuator 7. According to these embodiments, the movement limiting actuator 27' may be referred to as a polarity switching assembly. As seen in FIG. 2, the control arrangement 21 of the internal combustion engine 40 may be configured to control the movement limiting actuator 27'.

In FIG. 7*a*, the excentre 35 is illustrated in a first position causing a first relative distance between two assembly members 52, 54 of the movement limiting assembly 9', 9'', 9'''.

Figure 7B:
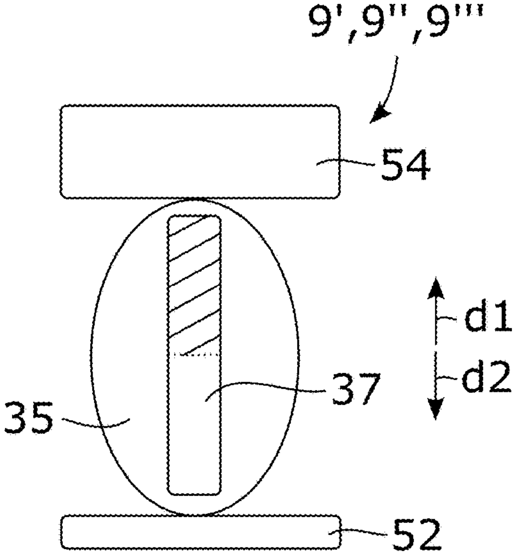

FIG. 7*b* schematically illustrates the movement limiting assembly 9', 9'', 9''' illustrated in FIG. 7*a* in which the excentre 35 is illustrated in a second position. In the movement from the first position to the second position, the excentre 35 forces the two assembly members 52, 54 to assume a second relative distance between the two assembly members 52, 54, wherein the second relative distance between the two assembly members 52, 54 is greater than the first relative distance. Below, simultaneous reference is made to FIG. 1-FIG. 7*b*, if not indicated otherwise.

Since the magnet 37 is configured to assume different positions based on the polarity of the electricity supplied to the armature actuator 7, the excentre 35 can be moved between the first and second positions simply by changing the polarity of the electricity supplied to the armature actuator 7. In other words, due to the features of the movement limiting assembly 9', 9'', 9''', the relative distance between the two assembly members 52, 54 can be changed simply by changing the polarity of the electricity supplied to the armature actuator 7.

The movement limiting assembly 9', 9'', 9''' according to the embodiments illustrated in FIG. 7*a* and FIG. 7*b* can be arranged at least partially inside the spring 8 as is illustrated in FIG. 4 and FIG. 5.

Moreover, according to some embodiments, the movement limiting actuator 27 of the movement limiting assembly 9 according to the embodiments illustrated in FIG. 6 may comprise an arrangement similar to the movement limiting assembly 9', 9'', 9''' explained with reference to FIG. 7*a* and FIG. 7*b*. In this manner, the number of elements 23 can be inserted between the windings of the spring 8 by increasing the relative distance between the two assembly members 52, 54 of the movement limiting assembly 9', 9'', 9'''. Moreover, the number of elements 23 can be moved out from the windings of the spring 8 by reducing the relative distance between the two assembly members 52, 54. In this manner, the movement limiting assembly 9', 9'', 9''' can limit the movement of the valve control portion 6' of the armature assembly 6 when the movement limiting assembly 9, 9', 9'' is activated.

According to the embodiments illustrated in FIGS. 7*a* and 7*b*, the magnet 37 is a permanent magnet comprising a magnetized body. However, according to further embodiments, the movement limiting assembly 9', 9'', 9''' may comprise an electromagnet configured to be activated, i.e., magnetized, by a supply of electric voltage, wherein the excentre 35 is operably connected to the electromagnet. According to such embodiments, the excentre 35 can be moved between the first and second positions by a control of the electric voltage supplied to the electromagnet so as to vary the relative distance between the two assembly members 52, 54.

Figure 8:
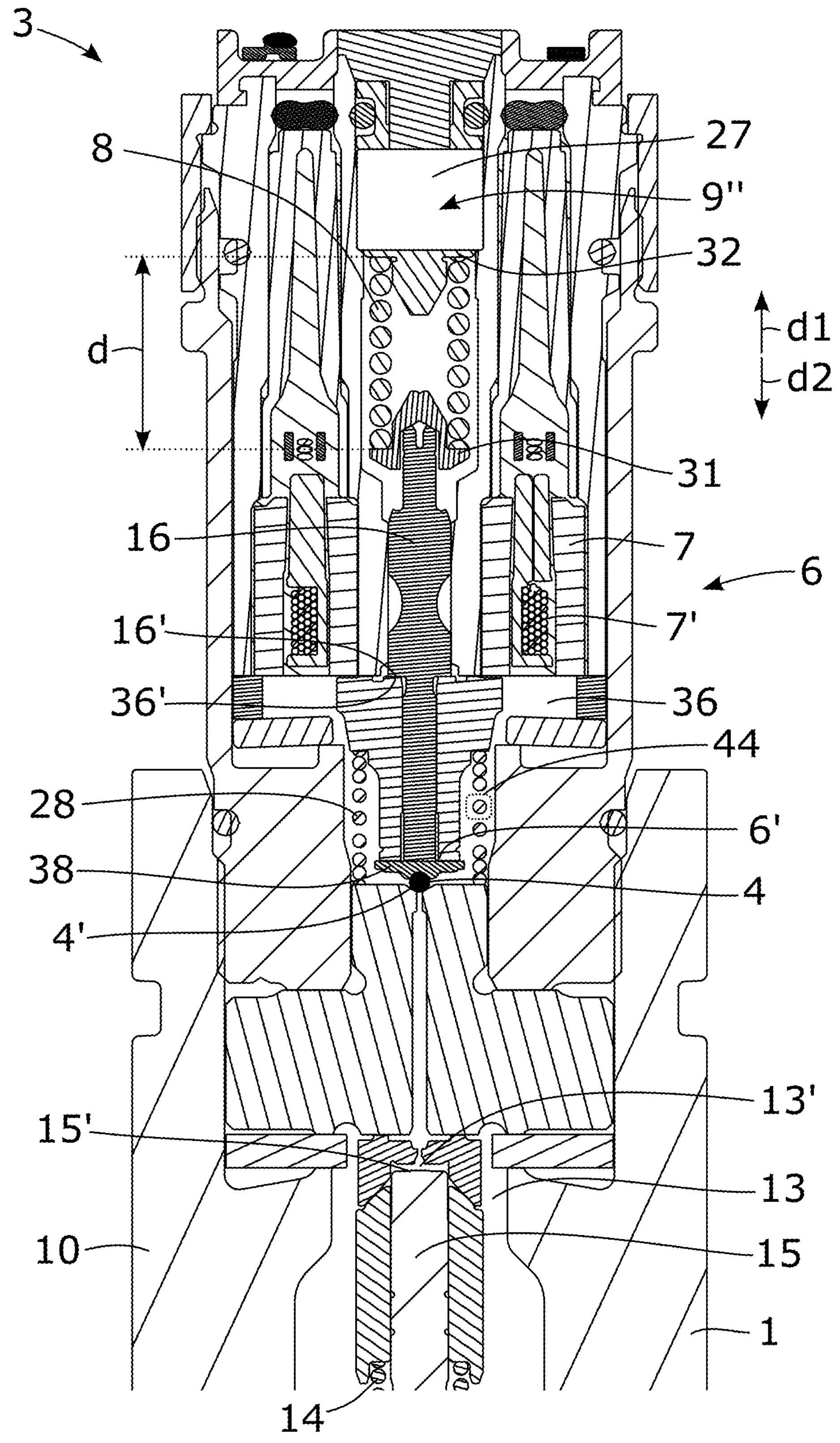
FIG. 8 illustrates a control valve arrangement of a fuel injector according to some further embodiments.

FIG. 8 illustrates a control valve arrangement 3 of a fuel injector 1 according to some further embodiments. The control valve arrangement 3 and the fuel injector 1 illustrated in FIG. 8 may comprise the same features, functions, and advantages as the control valve arrangement 3 and the fuel injector 1 explained with reference to FIG. 2-FIG. 5, with some differences explained below.

According to these embodiments, the movement limiting assembly 9'' is configured to limit the movement of the valve control portion 6' of the armature assembly 6 by reducing the distance d between the first and second abutments 31, 32 upon activation.

By reducing distance d between the first and second abutments 31, 32, the biasing force of the spring 8 is increased. Moreover, by reducing distance d between the first and second abutments 31, 32, the ability of the spring to compress is reduced. In this manner, the movement limiting assembly 9'' can limit the movement of the valve control portion 6' of the armature assembly 6 when the movement limiting assembly 9'' is activated.

According to these embodiments, the movement limiting assembly 9'' is arranged above the spring 8 as seen relative to the direction d1 indicated in FIG. 8, which is the same direction as the direction d1 indicated in FIG. 4 and FIG. 5.

The movement limiting assembly 9'' may comprise a movement limiting actuator 27 in the form of a piezoelectric element, a linear motor, or the like, for controlling the distance d between the first and second abutments 31, 32.

As an alternative, or in addition, the movement limiting assembly 9'' illustrated in FIG. 8 may comprise a movement limiting assembly 9'' according to the embodiments illustrated in FIGS. 7*a* and 7*b*.

According to such embodiments, one of the two assembly members 52, 54 may be operably connected to one of the first and second abutments 31, 32. Accordingly, in such embodiments, the distance d between the first and second abutments 31, 32 can be reduced by changing the polarity of the electricity supplied to the armature actuator 7 such that the excentre 35 assumes the second position illustrated in FIG. 7*b*. Moreover, the distance d between the first and second abutments 31, 32 can be increased by changing the polarity of the electricity supplied to the armature actuator 7 such that the excentre 35 assumes the first position illustrated in FIG. 7*a*.

Figure 9:
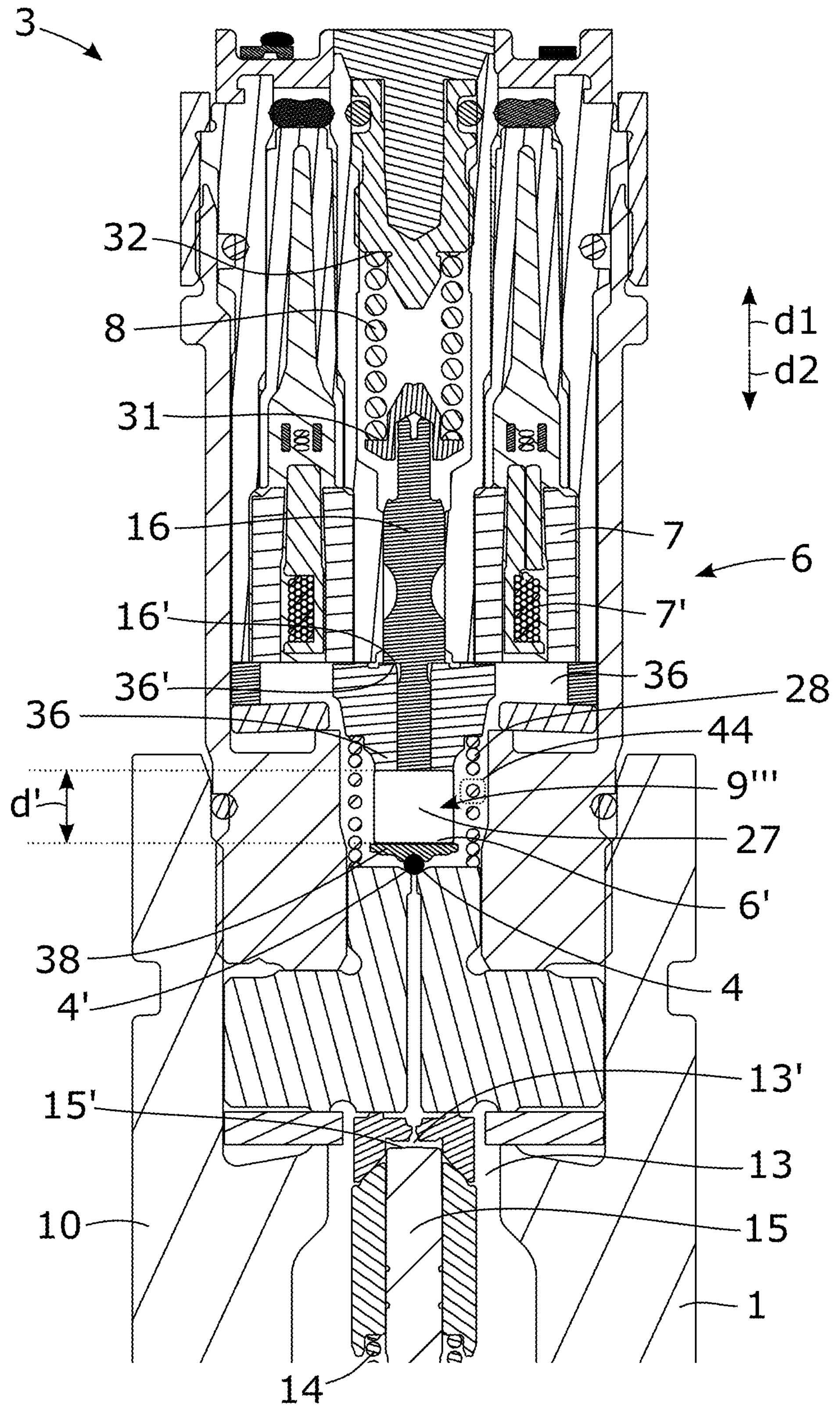
FIG. 9** illustrates a control valve arrangement of a fuel injector according to some further embodiments.

FIG. 9 illustrates a control valve arrangement 3 of a fuel injector 1 according to some further embodiments. The control valve arrangement 3 and the fuel injector 1 illustrated in FIG. 9 may comprise the same features, functions, and advantages as the control valve arrangement 3 and the fuel injector 1 explained with reference to FIG. 2-FIG. 5, with some differences explained below.

According to the embodiments illustrated in FIG. 9, the movement limiting assembly 9''' is arranged between the armature unit 36 and the valve control portion 6'. Moreover, according to the embodiments illustrated in FIG. 9, the movement limiting assembly 9''' is arranged inside the second spring member 28.

In these embodiments, the movement limiting assembly 9''' is configured to limit the movement of the valve control portion 6' by increasing the distance d' between the armature unit 36 and the valve control portion 6'. Thus, by activating the movement limiting assembly 9''' the movement transferred from the armature unit 36 to the valve control portion 6' can be limited.

The movement limiting assembly 9''' may comprise a movement limiting actuator 27 in the form of a piezoelectric element, a linear motor, or the like, for controlling the distance d' between the armature unit 36 and the valve control portion 6'.

As an alternative, or in addition, the movement limiting assembly 9''' illustrated in FIG. 9 may comprise a movement limiting assembly 9''' according to the embodiments illustrated in FIGS. 7*a* and 7*b*.

According to such embodiments, one of the two assembly members 52, 54 may be operably connected to the valve control portion 6' and the other of the two assembly members 52, 54 may be operably connected to the armature unit 36. Accordingly, in such embodiments, the distance d' between the armature unit 36 and the valve control portion 6' can be increased by changing the polarity of the electricity supplied to the armature actuator 7 such that the excentre 35 assumes the second position illustrated in FIG. 7*b*. Moreover, the distance d' between the armature unit 36 and the valve control portion 6' can be reduced by changing the polarity of the electricity supplied to the armature actuator 7 such that the excentre 35 assumes the first position illustrated in FIG. 7*a*.

The following is explained with simultaneous reference to FIG. 1-FIG. 9. The movement limiting assembly 9', 9'', 9''' according to the illustrated embodiments is configured to limit the movement of the valve control portion 6' when the armature assembly 6 moves from the closing position towards the opening position. In this manner, as is explained herein, a fuel injector 1 is provided having conditions for performing more controlled and accurate smaller types of injections, such as pilot and post injections, simply by activating the movement limiting assembly 9, 9', 9'', 9'''. Moreover, a fuel injector 1 is provided having conditions for allowing faster lift movements of the needle 15 when wanted, such as upon larger types of injections, for example larger types of main injections, simply by not activating, or by deactivating, the movement limiting assembly 9, 9', 9'', 9'''.

According to the embodiments illustrated in FIG. 4-FIG. 9, the movement limiting assembly 9, 9', 9'', 9''' is configured to mechanically limit the movement of the valve control portion 6' of the armature assembly 6 when the movement limiting assembly 9, 9', 9'', 9''' is activated.

Moreover, according to the embodiments illustrated in FIG. 4-FIG. 9, the movement limiting assembly 9, 9', 9'', 9''' is electrically actuated. In this manner, a high degree of control of the movement of the valve control portion 6' can be provided in a simple and efficient manner, and thereby also a high degree of control of the fuel injection of the fuel injector 1.

In addition, due to the features of the fuel injector 1, conditions are provided for a control of the speed of the needle 15 during an injection event. For example, the movement limiting assembly 9, 9', 9'', 9''' can be activated if there is a need for controlling the speed of the needle 15 after a certain lift.

Moreover, by changing the activation state of the movement limiting assembly 9, 9', 9'', 9''' during an injection event, considerable benefits to the rate shape can be obtained. That is, by controlling the activation state of the movement limiting assembly 9, 9', 9'', 9''', the pressure inside the control volume 13' can be controlled, which can provide several advantages, including a reduction of Start Of Injection SOI delays as well as End Of Injection EOI delays. Furthermore, by controlling the activation state of the movement limiting assembly 9, 9', 9'', 9''', the time needed for filling the control volume 13' with pressure can be reduced.

The control arrangement 21 of the internal combustion engine 40 may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The control arrangement 21 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g., a memory card, a flash memory, a USB memory, a hard disc, or another similar volatile or non-volatile storage unit for storing data such as e.g., ROM (Read-Only Memory), PROM (Programmable Read-Only Memory), EPROM (Erasable PROM), EEPROM (Electrically Erasable PROM), etc. in different embodiments.

The control arrangement 21 is connected to components of the internal combustion engine 40 and the fuel injectors 1 for receiving and/or sending input and output signals. These input and output signals may comprise waveforms, pulses, or other attributes which the input signal receiving devices can detect as information and which can be converted to signals processable by the control arrangement 21. These signals may then be supplied to the calculation unit. One or more output signal sending devices may be arranged to convert calculation results from the calculation unit to output signals for conveying to other parts of the vehicle's control system and/or the component or components for which the signals are intended. Each of the connections to the respective components of the internal combustion engine 40 for receiving and sending input and output signals may take the form of one or more from among a cable, a data bus, e.g., a CAN (controller area network) bus, a MOST (media orientated systems transport) bus or some other bus configuration, or a wireless connection.

In the embodiments illustrated, the internal combustion engine 40 comprises a control arrangement 21 but might alternatively be implemented wholly or partly in two or more control arrangements or two or more control units.

Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Vehicles and engines of the type here concerned are therefore often provided with significantly more control arrangements than depicted in FIG. 3, as one skilled in the art will surely appreciate.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A fuel injector (1) configured to inject fuel into a combustion chamber (42) of an internal combustion engine (40), the fuel injector (1) comprising:

an injector body (10) forming a valve seat (12), a fuel orifice (11) at the valve seat (12), and a fuel cavity (13) fluidly connected to the fuel orifice (11), a needle (15) arranged in the injector body (10) and being configured to open and close the fuel orifice (11) by interacting with the valve seat (12), a fuel supply port (17) fluidly connected to the fuel cavity (13), and a control valve arrangement (3), wherein the control valve arrangement (3) comprises:

a control valve (4) fluidly connected to a control volume (13') of the fuel cavity (13), an armature assembly (6) operably connected to the control valve (4) via a valve control portion (6') of the armature assembly (6), an armature actuator (7) configured to move the armature assembly (6) from a closing position towards an opening position to open the control valve (4) thereby causing a lift of the needle (15) from the valve seat (12) by hydraulic pressure of fuel supplied to the fuel cavity (13) via the fuel supply port (17), and a movement limiting assembly (9, 9', 9'', 9''') configured to limit the movement of the valve control portion (6') upon activation, wherein the movement limiting assembly (9, 9', 9'', 9'') is configured to be activated by changing the polarity of the electricity supplied to the armature actuator (7).

2. The fuel injector (1) according to claim 1, wherein the control valve arrangement (3) comprises a spring (8) configured to apply a biasing force onto the armature assembly (6) towards the closing position.

3. The fuel injector (1) according to claim 2, wherein the movement limiting assembly (9, 9', 9'', 9'''') is configured to limit the movement of the valve control portion (6') by increasing the biasing force of the spring (8).

4. The fuel injector (1) according to claim 2, wherein the spring (8) is a coil spring, and wherein at least part of the movement limiting assembly (9, 9', 9' ") is arranged inside the spring (8).

5. The fuel injector (1) according to claim 2, wherein the spring (8) is a coil spring, and wherein the movement limiting assembly (9, 9" ") is configured to limit the movement of the valve control portion (6') by inserting a number of elements (23) between windings of the spring (8) upon activation.

6. The fuel injector (1) according to claim 2, wherein the spring (8) is configured to apply the biasing force onto the armature assembly (6) by applying a separating force between a first and second abutments (31, 32), and wherein the movement limiting assembly (9") is configured to limit the movement of the valve control portion (6') by reducing the distance (d) between the first and second abutments (31, 32) upon activation.

7. The fuel injector (1) according to claim 1 or 2, wherein the armature actuator (7) is configured to move the armature assembly (6) by moving an armature unit (36) of the armature assembly (6), and wherein the movement limiting assembly (9") is arranged between the armature unit (36) and the valve control portion (6').

8. The fuel injector (1) according to claim 7, wherein the movement limiting assembly (9' ") is configured to limit the movement of the valve control portion (6') by increasing the distance (d') between the armature unit (36) and the valve control portion (6').

9. The fuel injector (1) according to claim 1, wherein the armature actuator (7) comprises an electromagnet (7') configured to generate a magnetic field to move the armature assembly (6) from the closing position towards the opening position.

10. The fuel injector (1) according to claim 9, wherein the movement limiting assembly (9, 9', 9", 9" ") comprises a magnet (37) configured to assume different positions based on the polarity of the electricity supplied to the electromagnet (7').

11. The fuel injector (1) according to claim 10, wherein the movement limiting assembly (9, 9', 9", 9'") comprises an excentre (35) operably connected to the magnet (37).

12. The fuel injector (1) according to claim 1, wherein the control valve arrangement (3) comprises a movement limiting actuator (27, 27') in form of a polarity switching assembly for activating the movement limiting assembly (9, 9', 9", 9" ").

13. The fuel injector (1) according to claim 12, wherein the movement limiting actuator (27) comprises a piezoelectric element.

14. The fuel injector (1) according to claim 12, wherein the movement limiting actuator (27) comprises a linear motor.

15. An internal combustion engine (40) comprising a fuel injector (1) according to claim 1, wherein the fuel injector (1) is configured to inject fuel into a combustion chamber (42) of the internal combustion engine (40).

16. A vehicle (2) comprising an internal combustion engine (40) according to claim 15.

* * * * *